United States Patent [19]
Garland et al.

[11] Patent Number: 6,104,804
[45] Date of Patent: Aug. 15, 2000

[54] CONTROL OF TELEMETRY INTERFACE GATEWAY DURING A VOICE CALL

[75] Inventors: Stuart Mandel Garland, Morton Grove; David B. Smith, Hinsdale, both of Ill.

[73] Assignee: Lucent Technologies, Inc., Murray Hill, N.J.

[21] Appl. No.: 08/994,232

[22] Filed: Dec. 19, 1997

[51] Int. Cl.[7] .................................................. H04M 11/00
[52] U.S. Cl. ...................... 379/265; 379/106.03; 379/210
[58] Field of Search ............................... 379/265, 106.03, 379/106.01, 201, 210, 211, 212, 215, 401

[56] References Cited

U.S. PATENT DOCUMENTS

| | | | |
|---|---|---|---|
| 5,528,675 | 6/1996 | Chen | 379/201 |
| 5,583,923 | 12/1996 | Hoy et al. | 379/106.08 |
| 5,802,155 | 9/1998 | Garland et al. | 379/106.09 |

*Primary Examiner*—Scott Wolinsky
*Attorney, Agent, or Firm*—Werner Ulrich

[57] ABSTRACT

A method and apparatus for accessing customer telemetering equipment while on a voice connection between an agent of a customer server and the customer. A voice connection is initially established between a customer and an agent of a server such as a utility. The original connection may be established when a customer complains, or in response to receipt of a complaint report at an earlier time. If, during the discussion between the customer and an agent of the server, the agent believes that accessing the customer's telemetering equipment might help to uncover the problem, the agent signals a customer Telemetering Interface Gateway to allow the agent to access the appropriate telemetering equipment. After the agent has obtained information from this equipment, the agent sends another signal to the Gateway and the voice connection to the customer is re-established. Advantageously, problems can be discussed and solved while the customer is still connected to the agent, thus avoiding repeated telephone calls.

4 Claims, 3 Drawing Sheets

CONTROL OF TELEMETRY INTERFACE GATEWAY DURING A VOICE CALL

TECHNICAL FIELD

This invention relates to arrangements for accessing customer telemetered equipment while connected on a voice connection to a utility.

Problem

Standard arrangements now exist for allowing a utility to access metering equipment or to control units such as air conditioning units over the telephone connection to a customer. The present arrangements have the disadvantage that they can only be used when the line is not busy, i.e., is not engaged in a communication unless expensive integrated data/voice modems are installed at both ends of the connection or, undesirably, when "barge-in" is invoked. Frequently, however, when a customer calls a utility, the customer's problems can be resolved by accessing the customer's metering equipment from the utility. For example, if the customer complains that his bill was much too high the previous month, the utility can access the electric meter to determine its present reading and thereby check to see if the bill was based on an erroneous reading, or download stored maintenance data. In other applications, a service bureau can perform diagnostic tests on customer appliances. The problem of the prior art is that there are no low cost arrangements for allowing the utility or service bureau to access the customer's telemetering equipment without requiring the customer to first hang up and then be re-called after the automated reading has been executed, or to send someone to the customer's location to manually read the meter. In view of the high cost of handling customer communications, the inability to solve the problem immediately by accessing the metering equipment while a customer is still connected to a service representative is costly and is not really acceptable customer service. (For clarity, the term "utility" as used hereinafter includes a service bureau).

Solution

The above problem is solved and an advance is made over the prior art in accordance with this invention wherein an alert signal is sent to activate a telemetering interface gateway (TIG) unit at the customer's premises while the line is in the off hook state, (e.g., during an active voice call). Advantageously, this then permits the meter equipment at the customer's premises to be accessed while the customer is in the off-hook state. In accordance with one preferred embodiment, a security dialogue takes place between the utility equipment and the telemetering interface to ensure that the utility is accessing the correct customer premises equipment and that the customer has the correct equipment. The switch can provide a security function by filtering return data to assure that only information that is authorized is sent to the utility. A timeout can be included in case the telemetry utility can access its data base to determine the type of TIG (including, for example, the alerting frequency. This dialogue can be in accordance with the prior art. After the measurement/control dialogue has been completed, the telemetering interface unit is deactivated and the customer is re-connected to the service representative of the utility.

In accordance with one preferred embodiment of applicant's invention the same alerting tone is used for off-hook alerting as for the conventional on-hook alerting. Advantageously, this simplifies the design of the telemetering interface Gateway (TIG) unit which normally uses on-hook alerting for taking readings and for controlling devices.

In accordance with applicants' preferred embodiment, when the utility agent switches from the conversational mode to the measurement and testing mode and causes the TIG alert signal to be sent, the customer's telephone may be partially or completely muted to avoid confusing or annoying the customer with loud tones required for the telemetering and testing functions. In accordance with a feature of this preferred embodiment, a lamp is lit on the customer telephone in order to assure the customer that he/she is still connected and that tests are being conducted and that the connection is not simply gone open or muted.

Advantageously, using this arrangement, a utility agent who is talking to a customer about a problem, can immediately cause a connection to the customer's telemetering equipment to be established, can perform any tests or measurements accessible via this telemetering connection and can then discuss any results with the customer, all without requiring a separate connection or a separate call back.

This arrangement can also be used to send a fax message, via a fax connected to the TIG, without disconnecting a call and while permitting an initial call to be continued after the fax has been transmitted.

DETAILED DESCRIPTION

Figure 1:
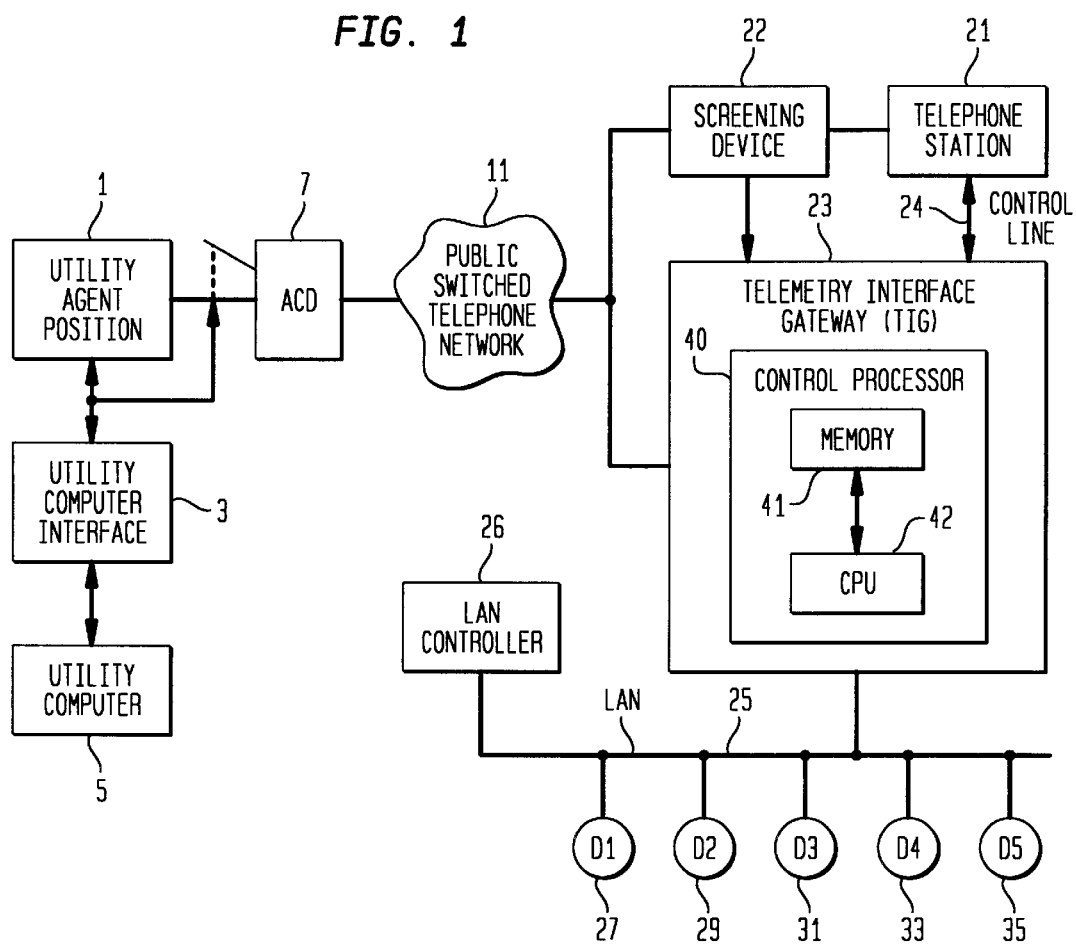
FIG. 1 is a block diagram illustrating applicants' invention.

FIG. 1 is a block diagram illustrating the operation of applicants' invention. A group of utility agent positions are connected to the public switched telephone network 11 through an automatic call distributor 7. A utility agent staffs a utility agent position 1 which contains a telephone and a keyboard for data entry and monitor for the display of data. The utility agent position is connected to a utility computer interface 3 which allows a plurality of utility agent positions to interface with a single utility computer 5. The utility computer interface sends data to and receives data from the utility agent position and passes such data from or to the utility computer. In addition, the utility computer interface receives instructions from the utility computer to transmit alert signals and telemetering control signals to the called customer device. Caller identification signals can be used as part of the verification process. The utility agent position 1 is connected via the public switched telephone network to the telephone station 21 of a customer. If the customer originates the call, a screening device 22 can detect whether the call is to a utility or service bureau, and if so, notify the TIG to initiate actions leading to initial tests prior to establishing a voice connection to an agent. (See FIG. 3). When, as a result of the conversation, the utility agent decides that tests should be applied or meters read, the utility agent causes a request to the utility computer to be generated and the utility computer causes an alerting signal to be sent out by the utility computer interface 3, which should, preferably, cause the customer's telephone talk/receive path to be muted. In this case, since the called station 21 is off-hook, the telemetry interface unit recognizes the alerting signal while the line to the telephone station is in the off-hook state. The telemetry interface unit 23 receives the alerting signal and responds to the alerting signal by participating in a security dialogue as required. This security dialogue is essentially the same security dialogue that is used for the normal on-hook Telemetry Interface Gateway (TIG) Unit connection, in that the utility verifies whom it is talking with, that the customer has the correct equipment, and the TIG verifies the authority of the utility. Note that all TIGs are initially on-hook receiving the alert tone and subaddress. As a result of receiving the alert tone and subaddress, the TIG may become an on-hook transmitting device or an off-hook transmitting device. The utility informs the switch of the off-hook or on-hook state since the switch responds differently to the two types of devices. In an alternative arrangement, the TIG becomes active after the security dialog. After the security dialogue has been successfully completed, the utility computer responds to requests keyed in by the utility agent at the utility agent position by causing the utility computer interface 3 to generate the control signals required to perform the tests and read the meters that the utility agent has requested; the agent can specify a pre-programmed set of tests or specific tests. The Telemetry Interface Gateway (TIG) unit receives these control signals and responds to them by querying the meters and performing the appropriate tests. The Telemetry Interface Gateway (TIG) unit then transmits back to the utility computer interface 3, the signals representing the results of the meter readings and tests. These signals are interpreted by the utility computer 5 which generates data for display at the utility agent position and records the data in the utility computer for rebilling and other future purposes. The computer can suggest alternative actions to the agent. The utility agent position can generate additional requests for meter readings and data based on the results of the earlier tests and meter readings. When the utility agent is satisfied with the results of the tests or feels that no further tests are likely to be useful, the utility agent requests a disconnection of the Telemetry Interface Gateway (TIG) unit and a reconnection of the voice connection to the telephone station 21, and the light goes out. Alternatively, the utility agent can then discuss the results of these tests with the customer at telephone station 21. The utility computer causes a signal to be sent to the Telemetry Interface Gateway (TIG) unit to disconnect the Telemetry Interface Gateway (TIG) unit connection and to re-establish the full connection (without muting) of the telephone station. In both cases, the TIG sends a signal back to the utility indicating its idle state, or simply removes a carrier signal. In contrast to a normal TIG connection, the TIG does not send a full connection disconnect back to the switch after the read/test cycle has been completed; instead a voice connection remains and, if previously muted, is restored to normal.

During the time that the Telemetry Interface Gateway (TIG) unit is in the active state, the telephone station can be partially or completely muted via control line 24 or special muting tone from the utility so that the customer does not hear loud data signals and does not generate speech signals which might interfere with the data signals. Control line 24 can either send tone to station 21 or activate an electrical circuit. If tone is sent from the utility or the TIG, a regular line can be used. Complete muting can be accomplished by simply disconnecting the handset; partial muting (which has the advantage of letting the customer hear tones indicating that something is going on) can be accomplished by shunting the microphone and earphone of the handset, or by inserting impedance in series with these devices. Alternatively, the customer can simply be warned about the presence of signals on the line and be asked to refrain from speaking until the agent speaks. A lamp at the customer's station can indicate that the TIG is communicating with the utility. The latter arrangement has the advantage of being supported by existing telephone stations.

FIG. 1 shows the Telemetry Interface Gateway (TIG) unit connected to a small local area network 25 controlled by a local area network controller 26. Local area network is connected to devices D1 (27), D2 (29), D3 (31), D4 (33), and D5 (35). These devices are interfaces to meters or to the controls of units such as air conditioning units, furnaces, or other devices. If only a single meter is being telemetered by TIG 23 a more direct connection between the TIG and the device can be used.

Figure 2:
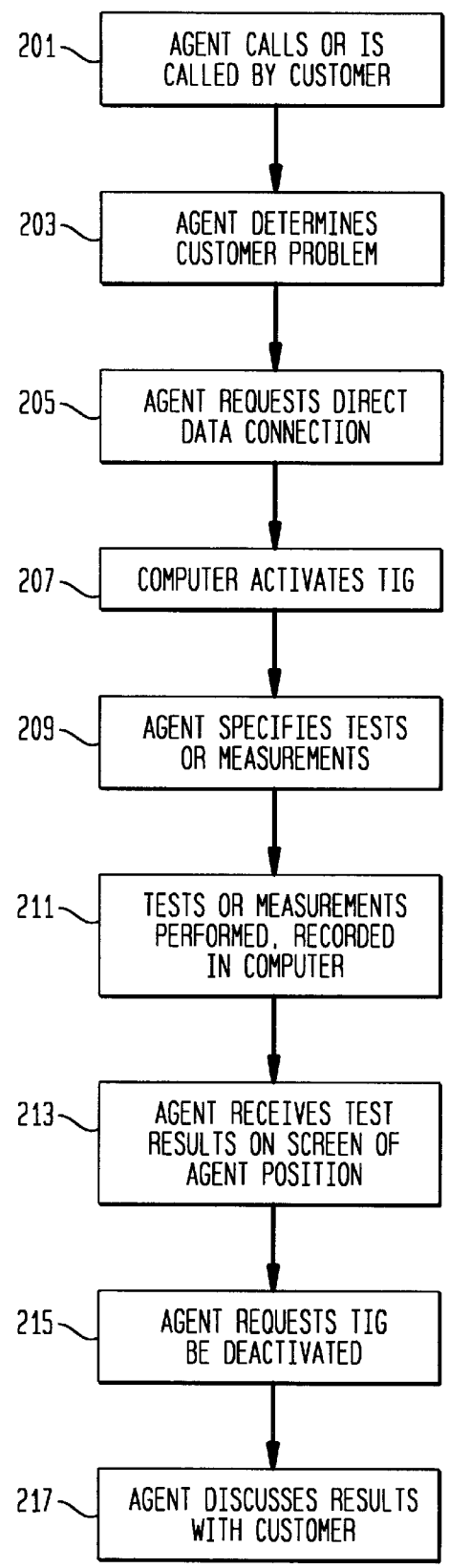
FIGS. 2 and 3 are flow diagrams for alternative methods of utilizing applicants' apparatus.

FIG. 2 is a flow diagram illustrating the operation of applicants' invention. A utility agent is called by a customer having a telemetering interface unit or the agent has reason to believe that there is a problem and calls the customer (Action Block 201). The agent discusses the problem with the customer in sufficient depth so that the agent can make a decision as to what types of tests and meter readings are to be performed (Action Block 203). The agent then requests a direct data connection to the customer's TIG (Action Block 205). This request is entered by the agent by typing an appropriate command on the keyboard of the agent position. Data entered on this keyboard is sent to the utility computer. The utility computer responds to this request by activating the customer's TIG (Action Block 207). The activation is performed by sending an alert signal after which, in conformance with present practice in the industry, a security dialogue takes place between the computer and the TIG. If the security dialogue successfully establishes that the correct unit is being accessed by a computer having the right to access that TIG, and the TIG accepts the accessing computer, then the TIG has been activated. The agent specifies the tests or measurements that are wanted by typing further commands into the agent position (Action Block 209). In response to these requests from the agent, the utility computer causes data signals to be transmitted to the TIG to request the tests or measurements, and the TIG responds with the results of these tests or measurements by sending data signals back. The TIG 23 comprises a control processor 40, which includes a memory 41, and a CPU 42. The data is transmitted using analog transmission, e.g., frequency shift keying. The returned data signals are recorded and interpreted by the computer (Action Block 211) and are then used to control a display of the test data at the utility agent position. The agent examines these results, which may include alternative actions suggested by the computer, and if necessary, possibly on the basis of alternatives suggested by the computer, specifies additional tests or measurements or actions at the utility computer (rebilling, etc.) (repeat of Action Blocks 209 and 211 which are then performed). The agent receives test results and any other data on a screen (Action Block 213). Eventually, the agent recognizes that no further tests or measurements are needed or are useful, and the agent requests that the TIG be deactivated (Action Block 215). The computer responds to this request by causing a deactivation signal to be sent to the TIG and the TIG, upon receiving that deactivation signal, re-establishes the normal connection between the customer telephone station and the agent position by removing any muting, turning off the telemetering lamp, and deactivating itself. Typically, the deactivation signal can be an 800 millisecond open loop signal to disconnect a modem carrier, or a deactivation message to the TIG. Subsequently, the agent discusses the results with the customer (Action Block 217) and, if the result of the tests and measurements indicate a real problem, will cause a maintenance craftsperson to be dispatched to the customer's premises.

Figure 3:
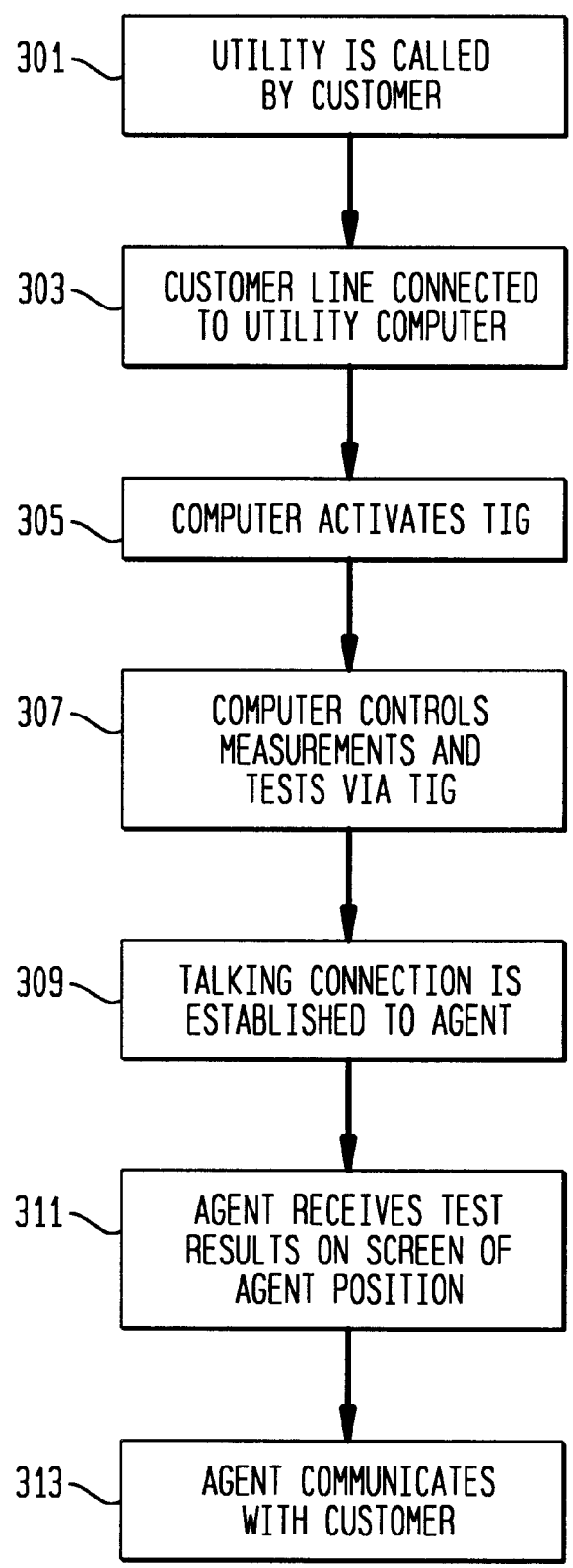

FIG. 3 illustrates the sequence of steps for an arrangement wherein the agent receives information about the latest customer status prior to talking to the customer. When the customer dials a number (Action Block 301) associated with the service department or billing department of a service provider, if the customer has a TIG for accessing metering and/or control equipment associated with the service provider, then an initial connection is established between a control computer or equivalent system of the service provider and the TIG of the customer (Action Block 303). The service provider equipment then activates the TIG (Action Block 305) and communicates with the TIG (Action Block 307) in order to obtain measurements from metering equipment connected to the TIG. The results of these measurements are stored and are provided to the agent (Action Block 311) that is subsequently connected to the calling customer (Action Block 309). The agent can then talk to the customer (Action Block 313). The arrangements of FIG. 2 can subsequently be re-invoked in case the agent needs additional measurements not automatically taken at the time the call is initially established. All of this is done within a single call, which saves time and which insures that a single agent handles the entire transaction.

The above is one illustrative embodiment of applicants' invention. Many other embodiments will be apparent to those of ordinary skill in the art without departing from the scope of the invention. The invention is limited only by the attached claims.

We claim:

1. A method of communicating between an agent of a service company and a customer wherein the customer has a Telemetering Interface Gateway (TIG) connected to the customer's telephone line comprising the steps of:

establishing a voice connection between an agent position and a telephone station of said customer;

responsive to a request from said agent position, disconnecting said voice connection and alerting the TIG of said customer while said customer telephone station remains off-hook;

sending control signals for requests to said TIG for controlling operations of units connected to said TIG;

sending response signals from said TIG for reporting responses to said requests;

responsive to a request from said agent position deactivating said TIG; and re-establishing said voice connection between said agent position and said customer telephone station.

2. The method of claim 1 further comprising the step of muting said customer telephone station while control signals and response signals are being exchanged between said agent position and said TIG of said customer.

3. The method of claim 1 further comprising the step of lighting a data lamp at premises equipment of said customer while said TIG, and said agent position are exchanging control and response signals.

4. Telemetering Interface Gateway (TIG) apparatus of a customer connected to the customer's telephone line for communicating with an agent position comprising a control processor;

said control processor comprising a central processing unit and memory;

said memory for storing a control program for controlling said control processor;

said control processor operative under control of said program for responding to a request from said agent position by being alerted;

said control processor responsive to control signals for requests for controlling operations of units connected to said TIG apparatus;

said control processor responsive to signals received from said units for sending response signals to said agent position; and said control processor responsive to a request received from said agent position for deactivating said TIG apparatus, and re-establishing a previously disconnected voice connection between said agent position and a telephone station of said customer.

* * * * *